June 30, 1953 — G. E. ROWE — 2,643,780
APPARATUS FOR HANDLING GLASSWARE
Filed May 11, 1946 — 3 Sheets-Sheet 1

Witness
W. B. Thayer

Inventor
George E. Rowe
by Parham & Bates
Attorneys

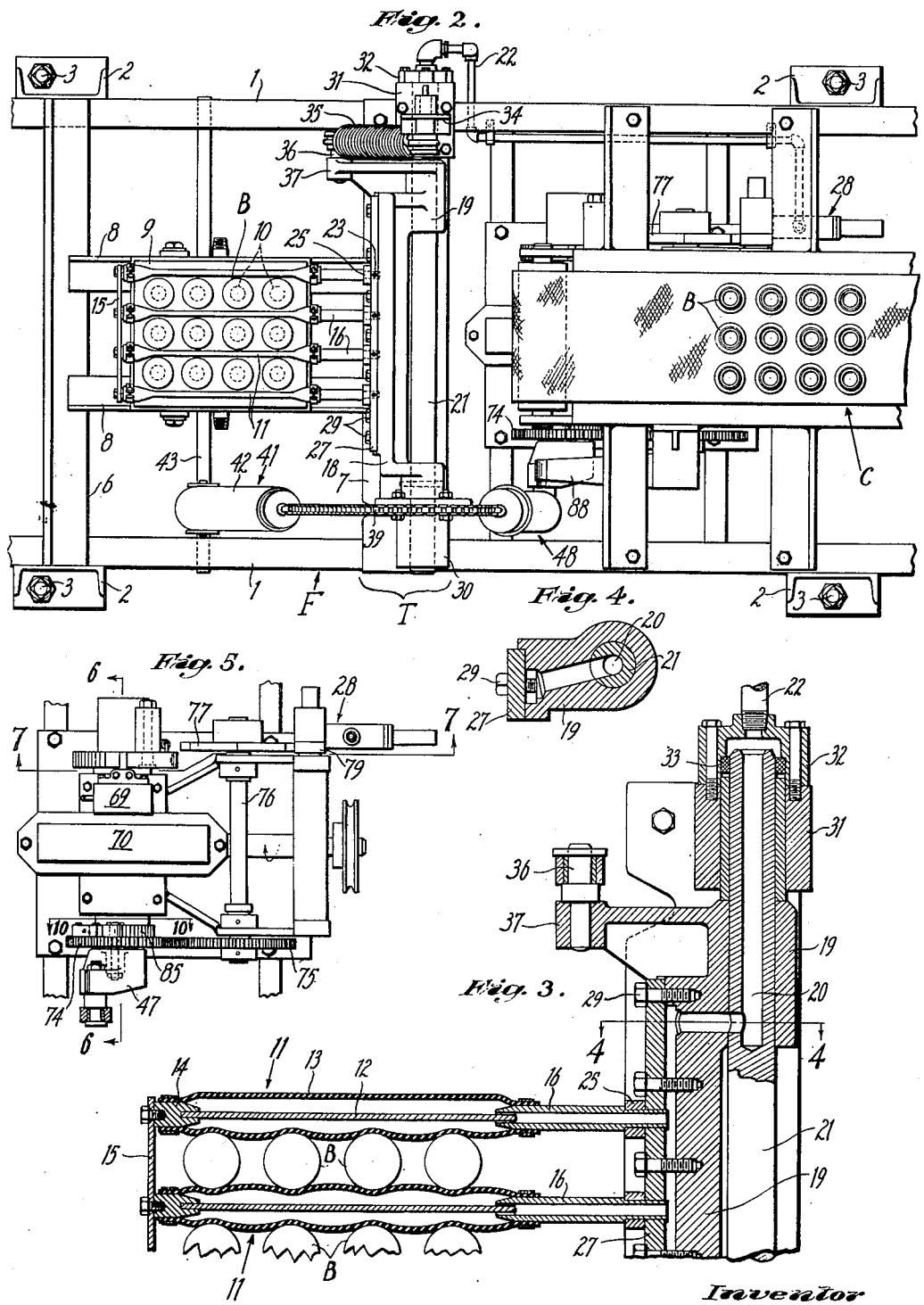

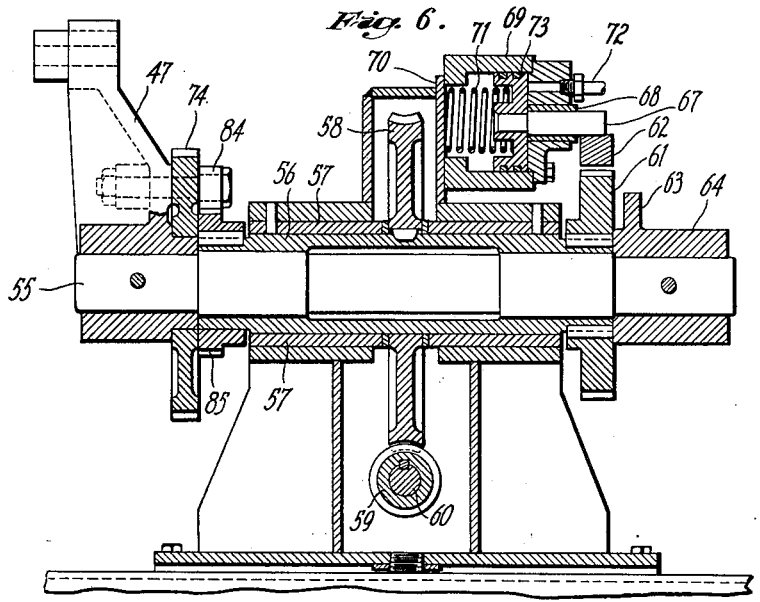
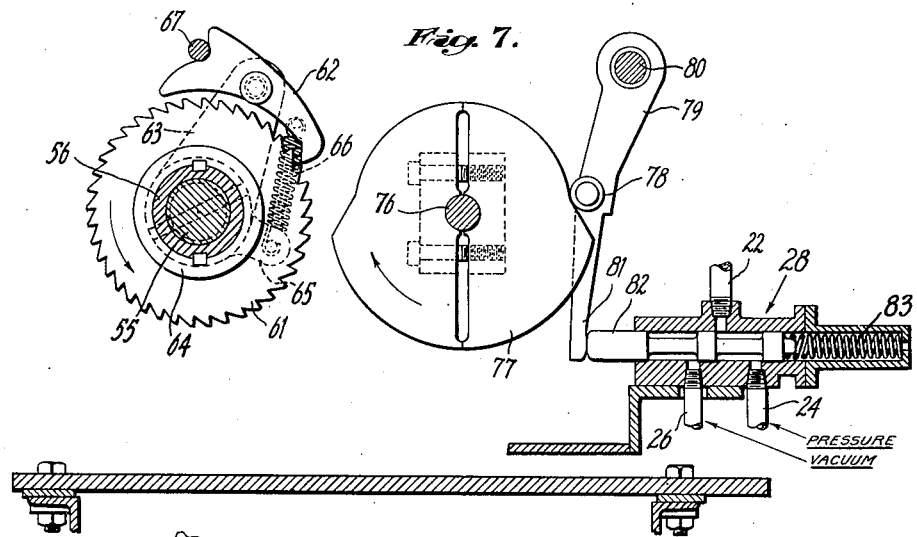
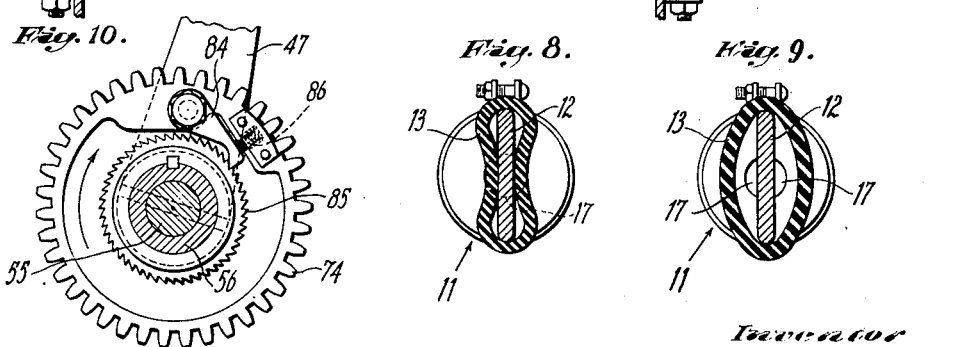

Patented June 30, 1953

2,643,780

UNITED STATES PATENT OFFICE 2,643,780

APPARATUS FOR HANDLING GLASSWARE

George E. Rowe, Wethersfield, Conn., assignor to Emhart Manufacturing Company, a corporation of Delaware Application May 11, 1946, Serial No. 669,052

4 Claims. (Cl. 214—1)

The invention relates to apparatus for transferring a plurality of glass articles, such as, for example, bottles, in a single operation and as a group from a receiving station to a delivery station.

An object of the invention is to provide a novel article gripping and releasing mechanism including cooperative hollow gripper members, each distensible and collapsible by internal fluid pressure, which members when distended are adapted to grip between them a plurality of spaced articles and hold them so spaced relative to one another and when collapsed release the articles in the same spaced relation.

Another object of the invention is to provide an apparatus of the character described that positions and secures a plurality of bottles by their sides and without gripping the mouths or bottoms of the bottles so that an operation, such as washing, may be performed on the bottles in upside-down positions at one station and thereafter transfer the bottles as a group and deposits the ware upright at a second station, such as for example, on a conveyor.

A further object of the invention is to provide apparatus that is uniform and accurate in operation and which without destructive pressure from the apparatus prevents contact between the ware so that losses through breakage are held to a minimum.

Another object of the invention is to provide a device of the type described embodying a transfer mechanism mounted for oscillation about a horizontal axis at accelerating and decelerating rectilinear speeds so that the tendency for the ware to swing at the time it is deposited is reduced. The advantage of such apparatus is particularly manifest in relatively tall ware of small cross section which might otherwise frequently fall over.

A still further object is to provide transfer mechanism comprising spaced parallel pneumatically expansible arms which grip a row of bottles or jars between them and which because of the yielding nature of pneumatic pressure permits all jars to be firmly held notwithstanding variations in diameter.

A still further object of the invention is to provide a restraining, inverting and transferring aparatus of the type described, the speeds and period of operation of which are capable of being accurately timed and synchronized with interdependent components with which the apparatus may be associated.

With these and other objects and advantages in view, the invention consists in the possible combinations set forth in the following specification and claims. In order to make the invention more clearly understood, there is shown in the accompanying drawings means to carry the same into practice. The structure there shown is one possible embodiment, and application of the invention should not be considered as limited to this particular construction which for purposes of explanation has been made the subject of illustration.

In the accompanying drawings, Figure 1 is a profile elevation of a combination restraining, inverting and transferring mechanism constructed in accordance with the present invention and, as shown in conjunction with a washing device, is operable to restrain a plurality of bottles during a washing operation and to thereafter invert and transfer the bottles to a conveyor;

Fig. 2 is a plan view of the structure shown in Fig. 1;

Fig. 3 is an enlarged sectional plan view taken substantially along the line 3—3 of Fig. 1 in which a portion of the apparatus is broken away;

Fig. 4 is a cross sectional view taken through line 4—4 of Fig. 3;

Fig. 5 is a plan view of a portion of the drive mechanism;

Fig. 6 is an enlarged cross sectional view taken along line 6—6 of Fig. 5;

Fig. 7 is an enlarged cross sectional view taken along line 7—7 of Fig. 5;

Fig. 8 is a transverse cross sectional view of one of the gripping arms in its collapsed position;

Fig. 9 is a view similar to Fig. 8 showing the cross section of a gripping arm in expanded position; and Fig. 10 is an enlarged sectional view, taken through line 10—10 of Fig. 5.

Figure 1:
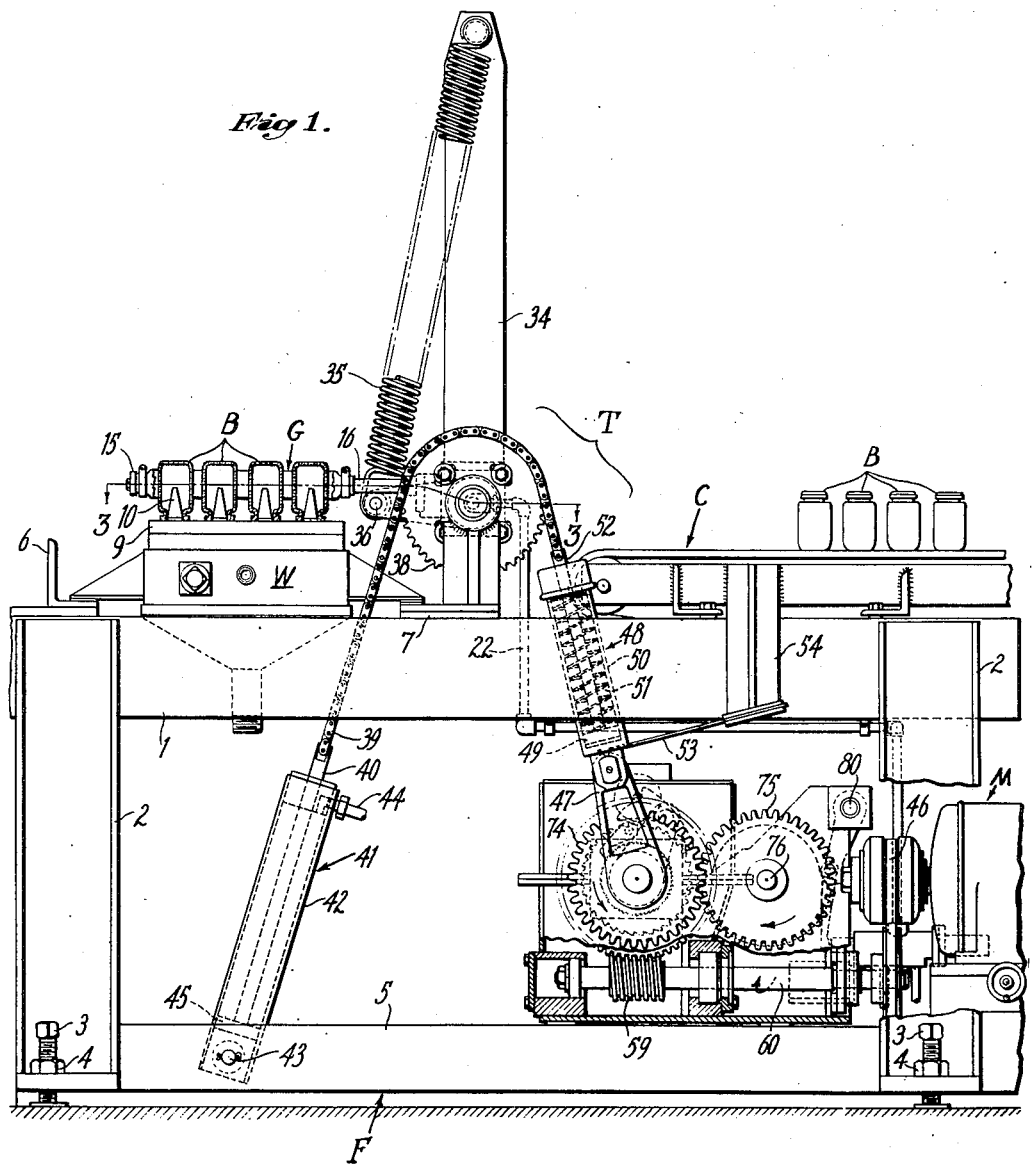

Referring to the drawings and particularly to Figs. 1 and 2, there is illustrated a bottle gripping mechanism, indicated generally by the letter G, which is adapted to secure a plurality of bottles B in cooperative relationship with a washer W during a washing operation. The gripper G forms a part of a transferring and inverting mechanism T which transfer the bottles as a group from their upside-down positions at the washer and deposits them in upright positions on a conveyor C. These components, together with suitable motivating and timing parts hereinafter described, are mounted on a frame F which may be of steel beam construction.

The frame F comprises a pair of spaced horizontal side rails 1 supported by legs 2, the feet of which are supported by jack screws 3 that may be adjusted and secured by lock nuts 4 relative to the legs 2 to level and true the frame relative to the floor. Lower side rails or stretchers 5 secured between the legs 2 provide additional rigidity and strength to the frame. An end rail 6 and center rail 7 are secured to the side rails 1 and support the washer W by means of rails 8 intermediate of and paralleling the rails 1.

The washer illustrated includes a horizontal bed plate 9 upon which the mouths of inverted bottles B may rest and a group of twelve spaced conical washing spouts or nozzles 10 disposed in three rows of four spouts. Each spout 10 is adapted to extend vertically upward into the neck of a bottle B and to center the inverted bottles on the plate 9 in the pattern illustrated in Figs. 1 and 2. The interior of each bottle is cleaned by a stream of a suitable cleansing fluid and thereafter an air blast from the nozzles 10.

The bottle gripper G for securing the bottles during the washing operation and for subsequently inverting the bottles and transferring them to the conveyor C is shown in Figs. 1 and 2 in its bottle securing position directly above the washer W.

More particularly, the gripper G comprises a set of four spaced parallel expansible and collapsible gripping arms 11. Each arm 11 is formed of a length of pneumatically inflatable and deflatable tubing, such as for example, rubber hose, in which a rigid member 12 of substantially rectangular cross-section is centrally disposed. Each pair of adjacent hose when pneumatically inflated is adapted to grip diametrically opposite portions of the sides of each bottle in the interposed row at or near the center or balance of the bottles.

The outer end of each rigid member 12 carries a plug 14 which forms an air-tight seal in the outer end of the encompassing hose 13. A spacing bar 15, bolted or otherwise secured to each plug 14, maintains the plugs 14 and outer ends of the arms 11 in proper spaced relation to the rows of bottles positionable therebetween.

Similarly, the inner ends of the tubes 13 are sealed to the outer surface of hollow cylindrical pipes 16 in which the inner ends of the members 12 are press fitted to provide rigid support therefor and, at the same time, provide air ports 17 through which fluid pressure may be supplied from and exhausted to the pipes 16 to inflate and deflate the arms 11. Air or other suitable fluid is supplied or exhausted through a manifold 19, a passage 20 in a partially hollowed rocker shaft 21 (Figs. 3 and 4) and a line 22 which is alternately connected to pressure and vacuum lines 24 and 26 through a cam actuated valve 28, the operational cycle of which will be described hereinafter.

In addition to providing a connection between the gripper arms 11 and the source of inflating and deflating fluid pressure, the manifold 19 and rocker shaft 21 comprise parts of the transfer mechanism T for moving the gripper from the station at the washer to the conveyor C. The gripper pipes 16 are rigidly secured by set screws 23, Fig. 2, and sealing members 25 to a cap plate 27, Figs. 2 and 3, which, with elongated crank member 18 to which it is secured by bolts 29, constitute the manifold 19. Bearing blocks 30 and 31 mounted on the side rails 1 of the frame F provide journals for the ends of the horizontal rocker shaft 21 to which the manifold 19 is secured. A packing gland 32 and packing 33 provides a leak-proof connection between the pressure line 22 and shaft passage 20. Extending upward from the bearing block 31 is a vertical support 34, the upper end of which pivotally secures the upper end of a coil spring 35. The lower end of spring 35 is similarly pivotally secured to and held in tension by a stud 36 carried by an arm 37 formed integral with the manifold member 19. The spring 35 serves the dual purpose of providing starting torque when a movement of the gripper G from one station to the other is initiated and of retarding the rate of travel of the gripper as the movement is completed.

Oscillation of the rocker shaft 21 and movement of the gripper G between the stations at the washer W and conveyor C is effected by a chain drive and cooperating pneumatic motor 41 and geared electric motor M.

The specific drive illustrated, comprises a chain 39 operably engaging a chain sprocket 38 secured to rocker shaft 21 adjacent the bearing 30. One end of the chain is fastened to the connecting rod 40 of the pneumatic reciprocating motor 41. The lower end of the motor casing 42 is pivotally secured by rod 43 to the side stretchers 5 of the frame. Fluid, as for example air under constant pressure of say 25 pounds from a source of supply (not shown) is admitted to the motor 41 through an air line 44 and continuously acts on piston 45 of the motor to urge rotation of the sprocket 38 and bottle gripper G to the station shown in Fig. 1.

Movement of the gripper to the depositing station above the conveyor C is effected by the electric motor M which is connected through a pulley drive 46, a shaft 60, an intermittent drive mechanism (described more in detail hereinafter with reference to Fig. 6), and crank 47 which is connected to chain 39 by a spring link 48.

More specifically the spring link includes a casing 50 containing a rod 52 connected at one end to the chain 39 and having fixed to its other end a disk 49. A spring 51 is compressed between the disk 49 and the upper end of the casing 50. The lower end of the casing is pivotally secured to the crank 47. The spring 51 is sufficiently strong so that the rod 52 will remain in the casing under the normal load exerted by the gripper. However, should the gripper become overloaded or stuck, the spring 51 permits the rod 52 to be withdrawn by the motor M from the casing and the crank 47 to complete a revolution without corresponding movement of the gripper. A leaf spring 53 secured to the frame by a support 54 is adapted to engage the crank 47 and releasably restrain the crank in the position shown in Fig. 1.

Referring more particularly to Figs. 6 and 7, the crank 47 is pinned to a shaft 55 which is journaled in a sleeve 56. The sleeve 56 is journaled in a split bearing 57 mounted on the frame. Keyed to the sleeve 56 is a worm gear 58 operably engaged and driven by a worm 59 secured to shaft 60. As heretofore indicated, the motor M drives the shaft 60 through the pulley drive 46. In order to transmit the rotation of the sleeve 56 to the shaft 55, there is secured to the sleeve 56 a toothed ratchet wheel 61 engagable with a pawl 62 pivotally mounted on an arm 63 of a bell crank 64. The bell crank 64 is pinned to the shaft 55 and its other arm 65 is connected by tension spring 66 to the ratchet-engaging end of the pawl 62. The other end of the pawl is engagable with a pin 67 which is adapted to rotate the pawl out of engagement with the ratchet 61. Pin 67 is reciprocally mounted by means of bushing 68 in a housing 69 secured to the casing 70 for the worm gear 58. Normally the pin 67 is retractably held in its outer or pawl-engaging position (Fig. 6) by a compression spring 71 located between it and the casing 70. Consequently the pawl is held out of engagement with the ratchet 61 and thus the driving connection between sleeve 56 and the shaft 55 is disengaged. However, the pin 67 may be disengaged from the pawl by fluid or air pressure acting through a line 72 on a piston 73 to which the pin is secured.

Retraction of the pin 67 releases and permits the pawl 62 to engage the continually rotating ratchet 61 which thereupon rotates the bell crank 64 and the shaft 55 pinned thereto through one revolution. Upon completion of one revolution of the shaft 55, the pin 67 reengages the pawl 62 and prevents further rotation of the shaft 55 until the pin 67 is again retracted by an air pressure impulse through the line 72.

Rotation of shaft 55 also controls the inflation and deflation of the gripper arms 11. This control is effected by means of a gear 74 secured on the hub of crank 47 for rotation therewith. As illustrated in Fig. 5, the gear 74 engages a like spur gear 75 keyed on a shaft 76 to which a split cam 77 is adjustably secured for rotation therewith. As seen in Fig. 7, the cam 77 engages a cam follower 78 rotatably secured to a lever 79 intermediate its pivot 80 and its free end 81. During a portion of the rotation of the cam 77, the lever end 81 moves the valve rod 82 of a valve 28 to the position in which it connects the gripper control line 22 with the vacuum line 26. During the rotation of the cam through the remainder of its revolution, the valve rod is moved by a spring 83 to the position illustrated in Fig. 7 whereat the line 22 is connected to the pressure line 24.

In the embodiment of the invention illustrated in the drawings, the gripper arms 11 are inflated or expanded to grip the bottles B at the bottle receiving station at the washer and remain inflated during rotation of the gripper G to the discharge station at the conveyor C. Thereupon, the valve 28 is actuated to deflate the gripper arms 11 and release the bottles, and the gripper arms 11 are returned deflated or collapsed to the bottle receiving station. It will of course be understood that the timing of the bottle gripping and releasing cycle may be varied by changes in the shape of the cam 77 or by a different adjustment of the cam 77 on the shaft 76.

The momentum of the parts, unequal variations in fluid pressure in the motor 41, or the tension exerted by the spring 35 may create a tendency for the mechanism to overrun. In order to overcome this tendency, a ratchet wheel 85 is keyed to the sleeve 56 (Figs. 5 and 10) for engagement with a pawl 84 which is pivoted to the gear wheel 74 carried on the hub of the crank 47. The teeth of the ratchet wheel 85 are inclined in an opposite direction from those of the ratchet wheel 61 whereby the pawl 84 is held by spring 86 in engagement with the ratchet wheel 85 thus preventing the crank from overrunning the sleeve 56. At the completion of one revolution of the crank 47, the pawl 62 is moved out of engagement with its associated ratchet wheel 61 by the stop plunger 67 and the ratchet wheel 85 rotates away from the pawl 84.

With the apparatus thus described in the position illustrated in Figs. 1 and 2, the subsequent operational cycle is as follows: Compression is exerted on the gripper actuating line 46 to distend the flexible hose arms so that they firmly engage the sides of the inverted bottles B without engaging the mouths or bottoms of the bottles. Thereupon the washer W may be operated without danger of the cleansing fluid emitting from the nozzles 10 dislocating or otherwise disturbing the position of the bottles. Thereafter fluid pressure is applied through line 72 to retract the pin 67 whereupon the pawl 62 engages the ratchet wheel 61 and forces the bell crank 64 and the shaft 55 to rotate through a complete revolution. Rotation through the first 180° causes the crank 47 to retract the spring link 48 and rotates the sprocket wheel 38 and gripper G through 180° thereby inverting the bottles and positioning them directly above the conveyor C. Thereupon the cam 77 shown in Fig. 7, acts to connect the gripper actuated line 22 with the vacuum line 26 and the gripper arms 11 is deflated and contracted to the position illustrated in Fig. 8, thus effecting the release of the upright bottles on the conveyor C. Further rotation of the shaft 55 through the remaining 180° permits the motor 41 to draw the chain 39 to the position shown in Fig. 1 and returns the collapsed gripper G to its receiving station position. Upon completion of this cycle the pin 67 reengages the pawl 62 whereupon the latter is disengaged from the ratchet wheel 61 and the cycle is completed. Additional bottles may thereafter be placed upon the washer and the cycle repeated.

It will be noted that the motor 41 constantly acts to draw the chain 39 to the position shown in Fig. 1, and though the action of the motor M is sufficient to overcome the force of motor 41, a damping effect is exerted by motor 41 on the movement of the gripper G from the bottle receiving to the bottle discharging station. Should the gripper become jammed or otherwise locked, the spring link 48 is sufficiently resilient to permit rotation of the crank 47 through its cycle without operation of the chain and sprocket drive.

The described construction insures that a bottle is moved vertically and horizontally at predetermined accelerating and decelerating velocities, thereby reducing the tendency to swing the bottles laterally at the conclusion of the transferring operation. This latter tendency is particularly undesirable in that the bottles might otherwise be released in position other than vertical, and as a consequence fall on their sides upon the conveyor and displace other bottles in the vicinity. Gripping of the sides of the bottles at points nearest their centers of gravity further minimizes their tendency to swing.

It will be apparent that this invention has many applications and advantages in addition to those specifically described herein and it will be understood that the elements constituting the invention may be varied in proportion, arrangement and mode of operation without departing from the nature and scope of the invention as set forth in the appended claims.

I claim:

1. Apparatus for handling a row of bottles comprising gripper means including a pair of gripping arms disposed at either side of said row of bottles at a bottle receiving station, said gripping arms being inflatable and deflatable and cooperating when inflated to resiliently and uniformly grip said row of bottles therebetween and when deflated to release said bottles simultaneously, means acting to invert and transfer said arms and bottles gripped therebetween as a unit from the receiving station to a discharge station and to reinvert and return the arms to the receiving station, means acting to effect deflation of the arms and release of the bottles at the discharge station and to effect inflation of the arms and gripping of the bottles therebetween at the receiving station, and means effecting a dwell in the movement of said gripper arms and restraint of the bottles gripped therebetween in cooperative relation at one of said stations.

2. Apparatus for handling a row of inverted bottles comprising gripper means including a pair of gripping arms disposed at either side of said row of bottles at a bottle receiving station, said gripping arms being inflatable and deflatable and cooperating when inflated to resiliently and uniformly grip said row of bottles therebetween and when deflated to release said bottles simultaneously, means acting to transfer said arms and bottles gripped therebetween as a unit between the receiving station and a discharge station, means which continually urge the gripper means to the receiving station and which assist in returning said gripper means to the receiving station from the discharge station, and means acting to effect deflation of the arms and release of the bottles at the discharge station and to effect inflation of the arms and gripping of the bottles therebetween at the receiving station.

3. Apparatus for handling glassware comprising a plurality of spaced gripping members each member being inflatable by fluid pressure, means adapted to effect inflation of said members to resiliently grip a plurality of bottles at a receiving station and to effect deflation of said members to discharge said bottles at a discharge station, means adapted to transfer said gripping members to the discharge station and to invert the bottles prior to discharging them at the discharge station, means being adapted to return the deflated gripping members to the receiving station in a single continuous operation, and means adapted to interrupt and restrain movement of the gripping members and the bottles gripped thereby at the receiving station prior to a transfer and inversion operation.

4. Apparatus for handling a row of bottles comprising gripper means including a pair of gripping arms disposed at either side of said row of bottles at a bottle receiving station, said gripping arms being pneumatically inflatable and deflatable and cooperating when inflated to resiliently and uniformly grip said row of bottles therebetween and when deflated to release said bottles, means acting to transfer said arms and bottles gripped therebetween as a unit from the receiving station to a discharge station and to return the arms to the receiving station, means acting to introduce subatmospheric pressure into and effect deflation of the arms and release of the bottles at the discharge station and to introduce superatmospheric pressure into and effect inflation of the arms and gripping of the bottles therebetween at the receiving station and means for effecting acceleration of the initial travel and deceleration of the final travel between stations.

GEORGE E. ROWE.

References Cited in the file of this patent

UNITED STATES PATENTS

| Number | Name | Date |
|---|---|---|
| 949,121 | Hood | Feb. 15, 1910 |
| 1,049,150 | Robail | Dec. 31, 1912 |
| 1,602,719 | Straight | Oct. 12, 1926 |
| 1,790,688 | Willer | Feb. 3, 1931 |
| 1,810,511 | Wolfinger | June 16, 1931 |
| 1,909,813 | Crosbie | May 16, 1932 |
| 1,926,041 | Freese | Sept. 12, 1933 |
| 1,943,483 | Miller | Jan. 16, 1934 |
| 2,213,629 | Fontaine | Sept. 3, 1940 |
| 2,308,209 | Schmutzer et al. | Jan. 12, 1943 |